United States Patent [19]
Holman

[11] 3,931,935
[45] Jan. 13, 1976

[54] METHOD OF AND APPARATUS FOR CUTTING VEHICLE TIRES

[76] Inventor: Merle A. Holman, 8873 Warnerville Road, Oakdale, Calif. 95361

[22] Filed: June 24, 1974

[21] Appl. No.: 482,378

[52] U.S. Cl. .................. 241/24; 241/29; 241/74; 241/80; 241/159; 241/236
[51] Int. Cl.² ........................................ B02C 7/04
[58] Field of Search ............ 241/24, 27, 29, 30, 74, 241/79.2, 79.3, 80, 97, 159, 167, 235, 236

[56] References Cited
UNITED STATES PATENTS

| 270,217 | 1/1883 | Gates ................................. 241/80 |
| 1,079,301 | 11/1913 | Lloyd ............................. 241/236 X |
| 1,883,578 | 10/1932 | Cody et al. ....................... 241/236 |
| 2,121,453 | 6/1938 | Sundstrand ....................... 241/167 |
| 2,370,129 | 2/1945 | Asbill, Jr. et al. ............. 241/167 X |
| 3,079,095 | 2/1963 | Beard ................................. 241/74 |
| 3,630,460 | 12/1971 | Goldhammer .................... 241/236 |
| 3,727,850 | 4/1973 | Krigbaum .......................... 241/159 |

*Primary Examiner*—Granville Y. Custer, Jr.
*Attorney, Agent, or Firm*—Phillips, Moore, Weissenberger Lempio & Strabala

[57] ABSTRACT

A method for cutting vehicle tires and the like is disclosed together with apparatus for practicing the method comprising a first plurality of cutting discs axially spaced from each other along a first shaft and a second plurality of cutting discs axially spaced from each other along a second shaft parallel to the first. The thickness and spacing of the cutting discs along their respective shafts and the spacing of the shafts with respect to each other is such that the cutting discs of each plurality intermesh with those of the other plurality with the overlapping side surfaces of the discs substantially in contact to provide a scissor like cutting action and the free peripheral surfaces of the discs of each plurality are spaced from the shaft of the other plurality a distance sufficient to allow passage of the cut slices of the vehicle tires or the like. Various embodiments including means for enhancing feeding action and for recycling the cut slices are described.

19 Claims, 12 Drawing Figures

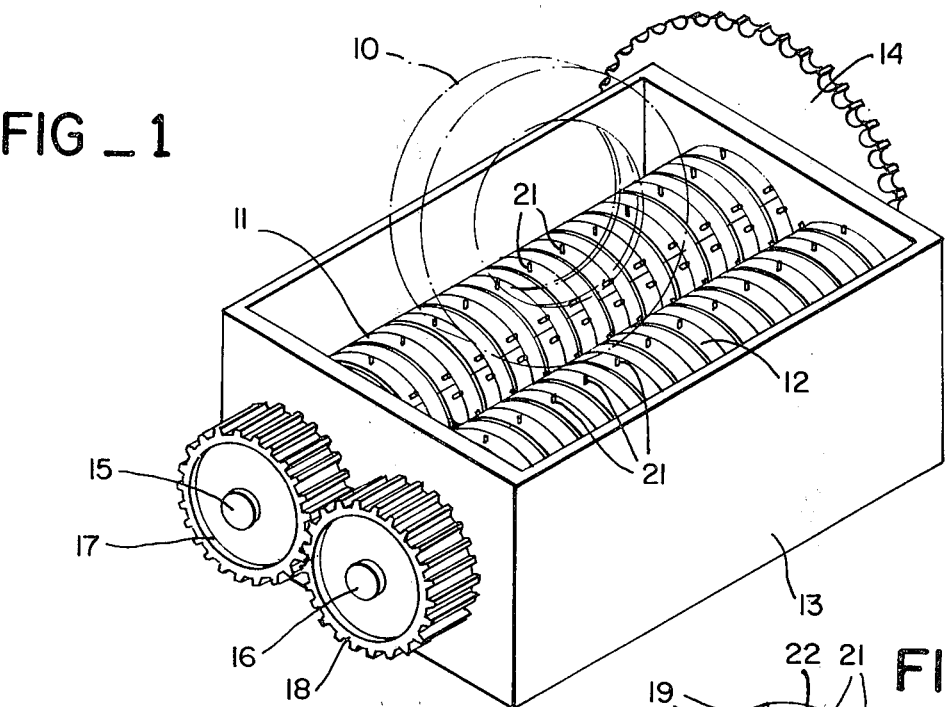
FIG_1
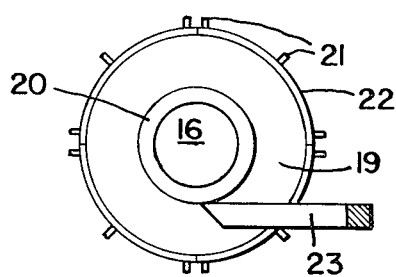
FIG_2A
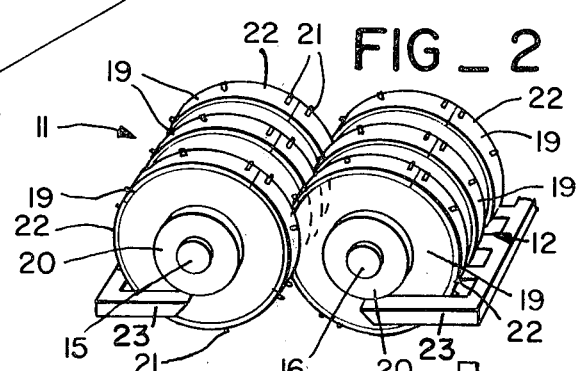
FIG_2
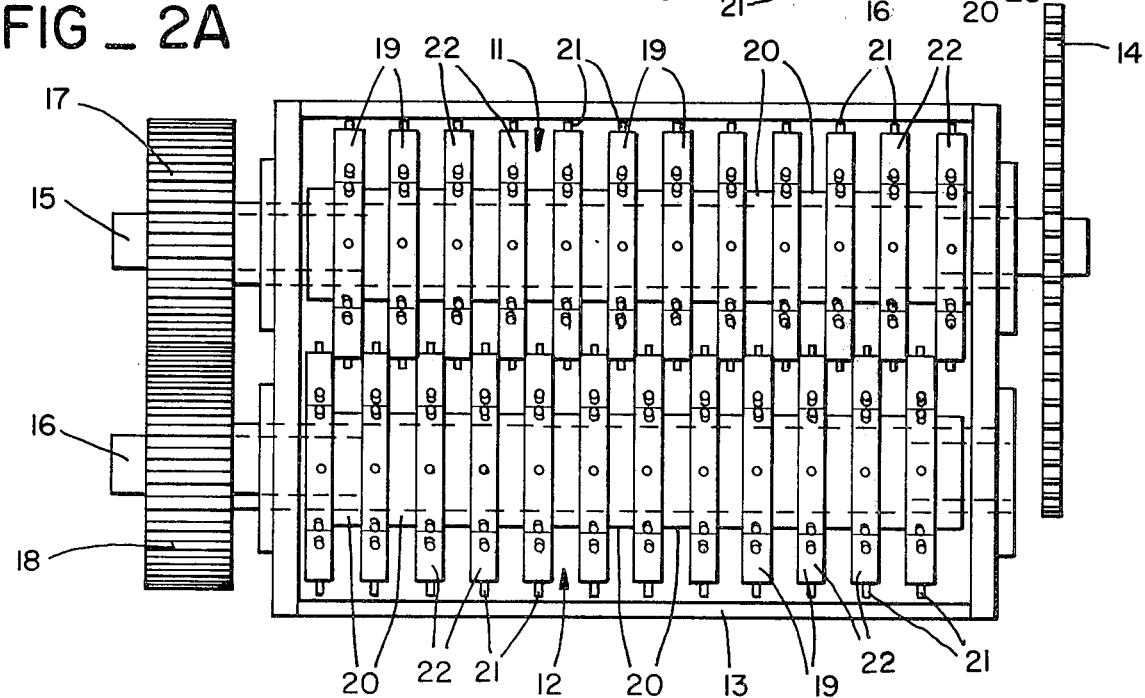
FIG_3

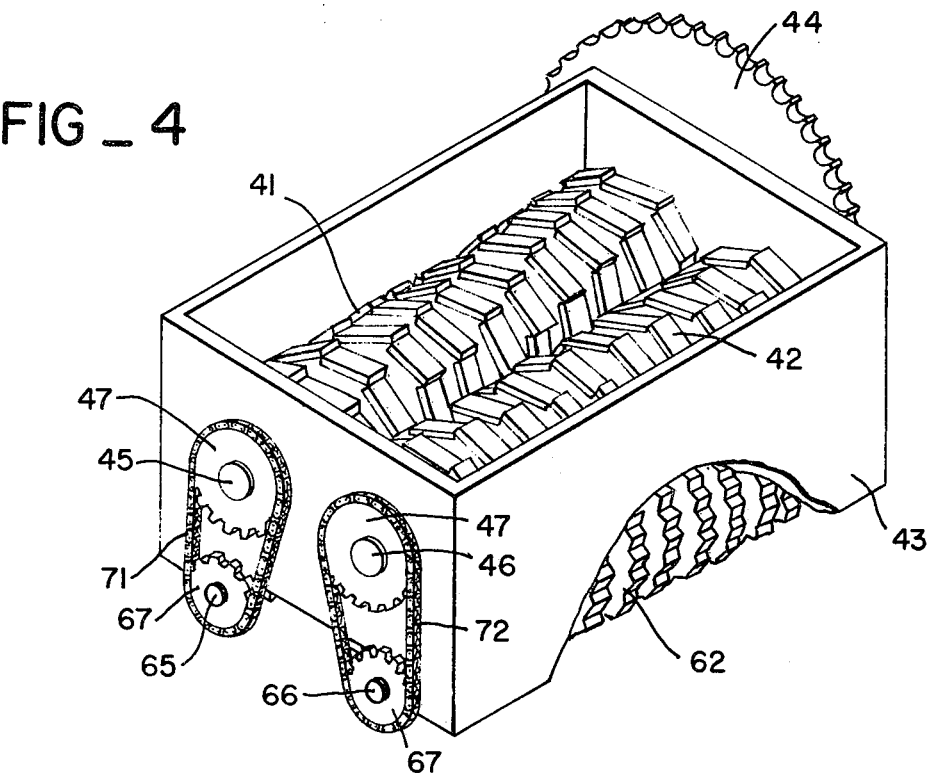
FIG_4
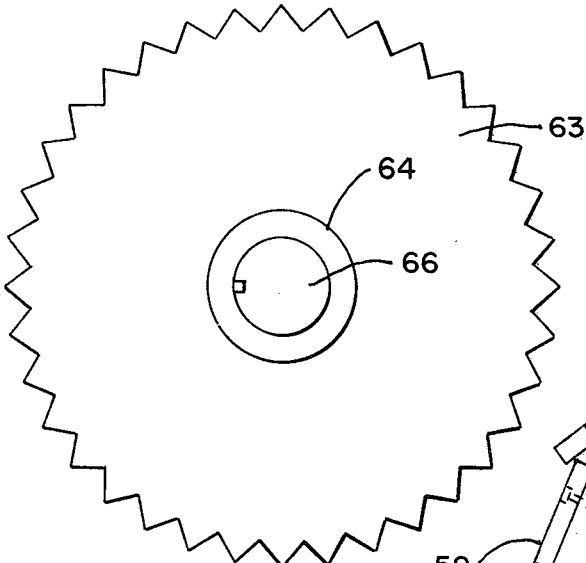
FIG_6
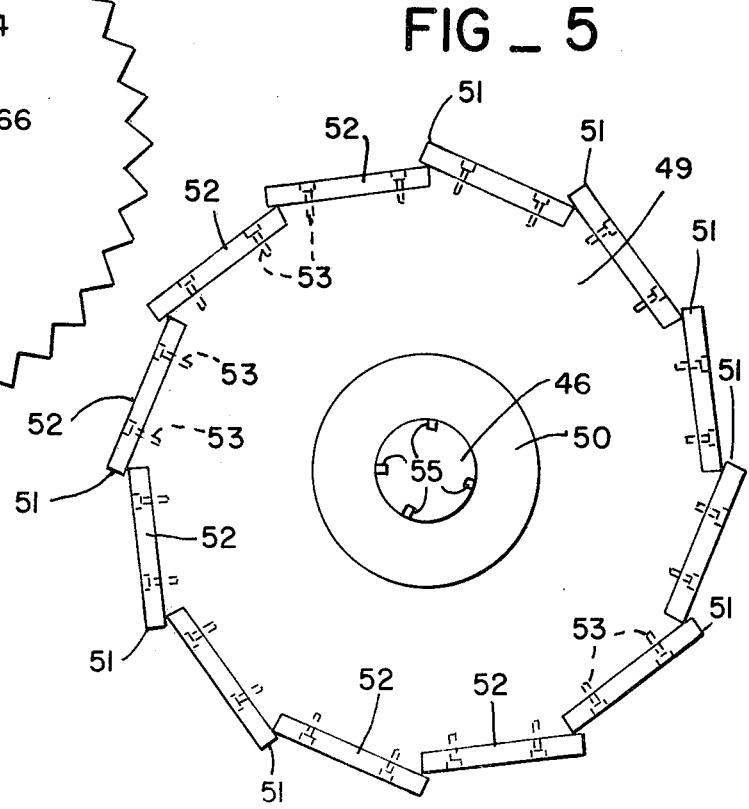
FIG_5

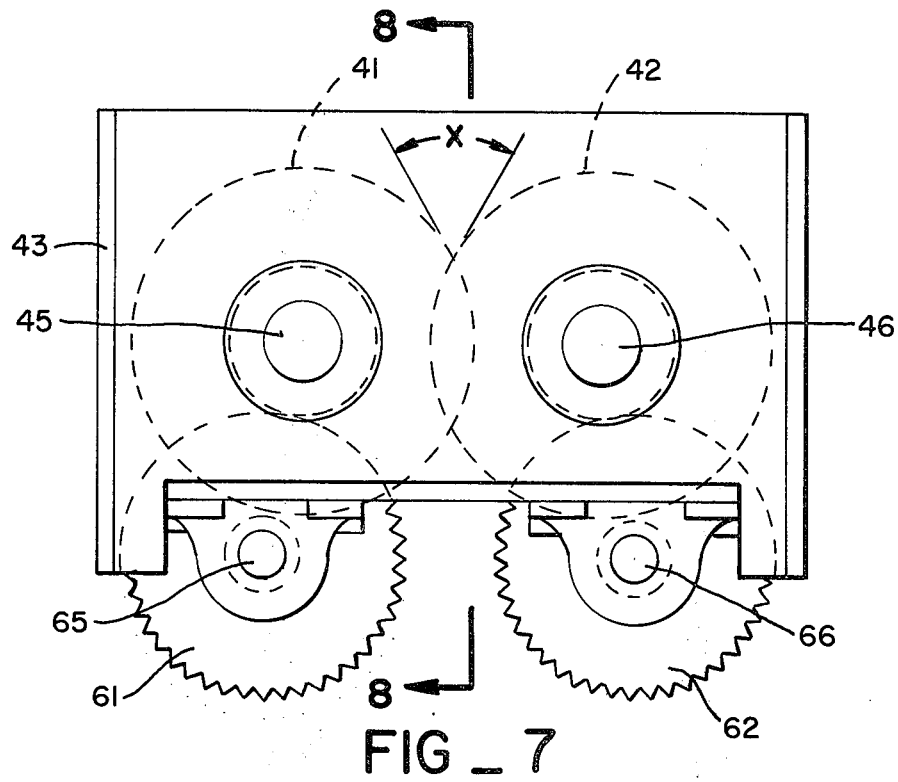
FIG _ 7
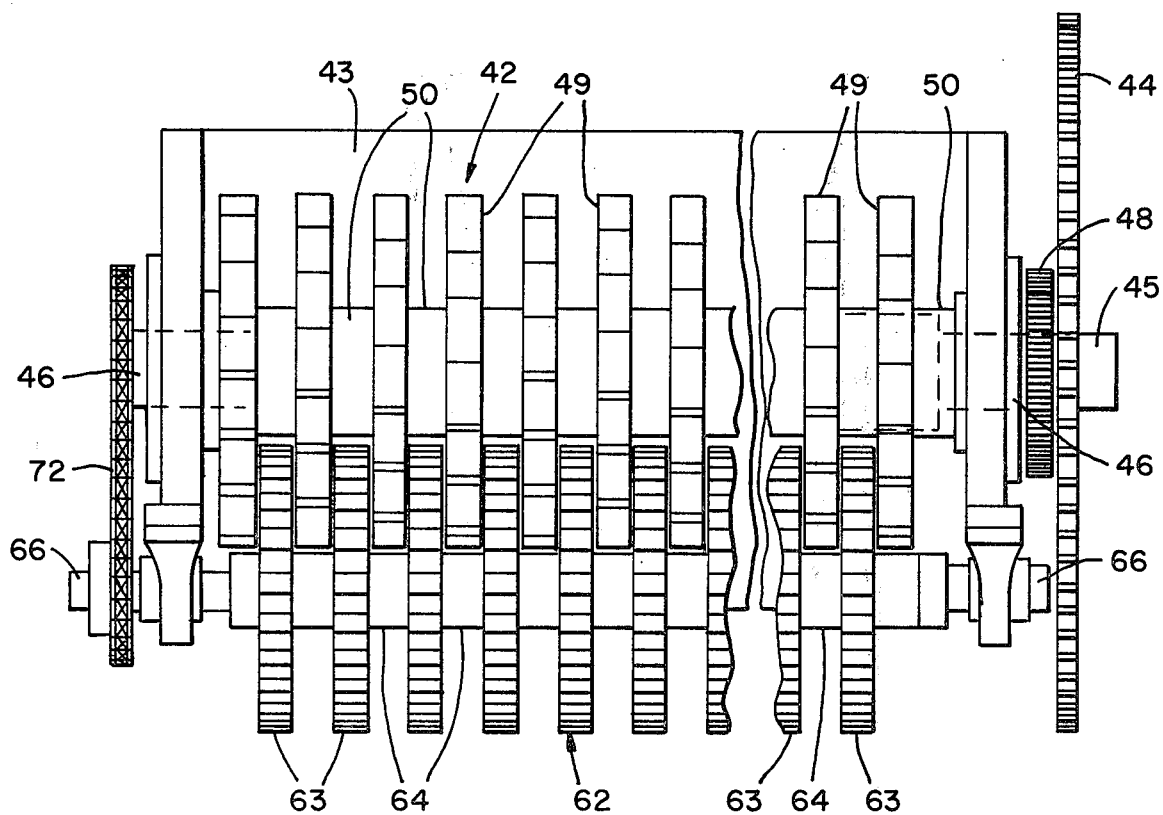
FIG _ 8

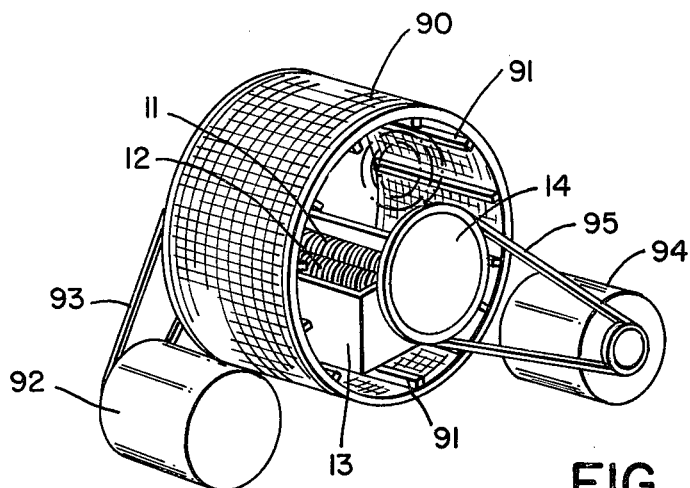
FIG_9
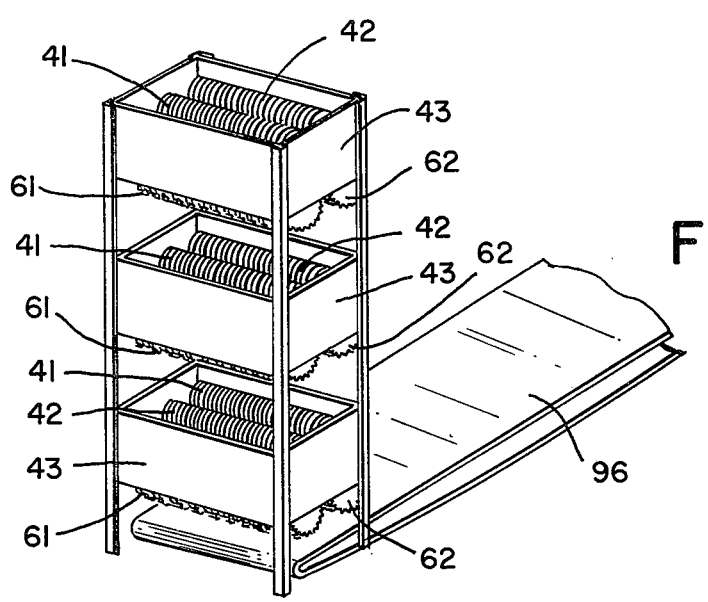
FIG_10
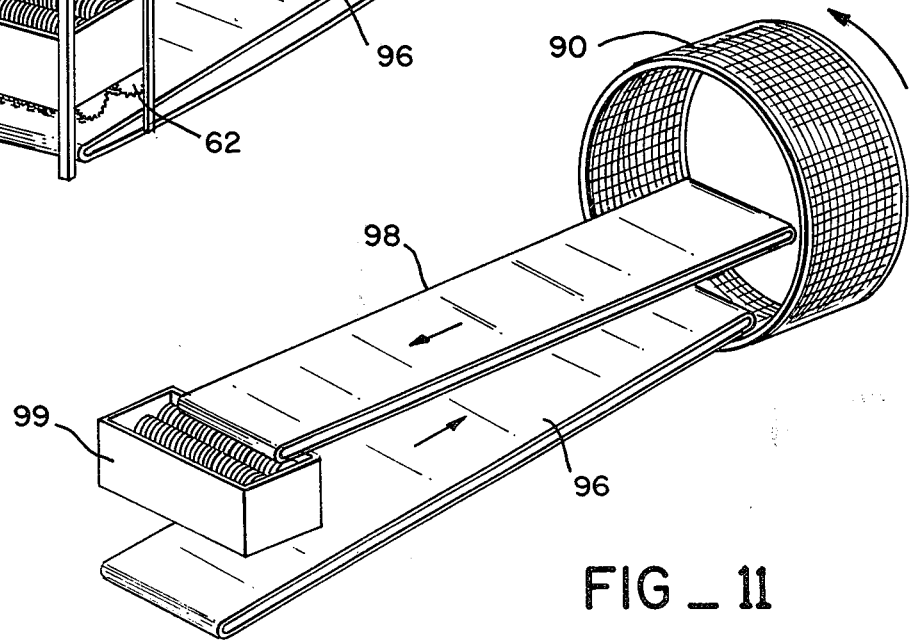
FIG_11

METHOD OF AND APPARATUS FOR CUTTING VEHICLE TIRES

BACKGROUND OF THE INVENTION

This invention relates to the process of reducing vehicle tires and the like to small parts and more particularly to the method of and apparatus for cutting the tires into slices by the scissors-like action of a plurality of overlapping discs.

The number of used vehicle tires which must be disposed of in the United States each year is obviously very large. Tires cannot be burned because of the air pollution problems involved and attempts to dispose of such tires in conventional dumps have been unsatisfactory because of the nature and conformation of the tires which causes them to work to the surface. The tires tend to have a lower density than the soil in which they are buried, particularly in view of the fact that it is difficult to fill the interior of the tire in the course of normal burying techniques. This, coupled with the resilience of the tire body, causes it to slowly rise with respect to the soil, eventually emerging to the surface where it will interfere with normal surface usage of the land.

In addition, the tires deteriorate at a very slow rate and resist the usual plowing and harrowing techniques used to break up and intermingle other cast-off objects with the soil in which they are buried to speed deterioration. Obviously, if the tires are reduced to smaller sized parts, such parts could be more effectively buried and the deterioration process would be accelerated. It is, of course, necessary to reduce the tires to small parts in order to practice known reclamation process for the re-use of the natural or synthetic materials of which the tires are made.

The use of various reinforcing materials, such as wires or plastic fibers in fabricating tires has complicated the problems involved in reducing tires to smaller parts. Thus, apparatus of the type disclosed in U.S. Pat. No. 2,462,692 in which the tires are torn into small pieces by hook-shaped teeth is ineffective, at least with respect to modern tires, because the reinforcing materials will tend to clog the apparatus tending to require frequent maintenance and excessive power in operation. In addition, such apparatus is complicated to fabricate and maintain.

Apparatus of the type disclosed in U.S. Pat. No. 3,578,252 in which materials are subjected to the chopping action of rotary blades while supported on stationary cutter bars might be capable of cutting the reinforcing materials of modern tires but, due to the resilience of the natural or synthetic rubber comprising the main portion of the tire body, it cannot be effectively cut by such chopping action and will tend to clog the apparatus, thus requiring excessive power in operation. In addition, such apparatus tends to produce excessive vibrations and cannot be operated at high speeds.

Apparatus of the type disclosed in U.S. Pat. No. 3,656,697 in which the tires are ground into small particles by a plurality of rows of interfitting abrading rotary blades is capable of handling both the resilient material and the reinforcing material of modern tires but is inherently slow in operation at practical power levels. It will be understood that the danger of fire due to the heat produced in the grinding operation also limits the speed with which a given tire can be reduced to small particles in such apparatus even where a water spray is used.

It is an object of this invention to provide a method capable of cutting modern reinforced vehicle tires and the like into small parts in large volume at practical power levels.

It is a further object of this invention to provide apparatus capable of cutting modern reinforced vehicle tires and the like into small parts, which apparatus is simple and convenient to fabricate and maintain.

It is a still further object of the invention to provide a method and apparatus for cutting vehicle tires and the like into small parts in large volume, which apparatus may be transported to and the method practiced at remote sites.

It is yet another object of this invention to provide apparatus capable of cutting modern reinforced vehicle tires and the like into small parts, which apparatus does not produce appreciable heat or appreciable vibration in operation even at high volume.

SUMMARY OF THE INVENTION

Briefly, the method and apparatus for cutting bodies of fiber reinforced resilient materials such as tires or the like into small parts according to the teaching of this invention comprises a pair of generally cylindrical cutting rolls mounted for rotation with their axes parallel and each including a plurality of axially spaced, radially extending ribs forming troughs therebetween with the ribs of each roll meshing with the ribs of the other roll. Each of the ribs have planar sides with a side of each rib overlapping and substantially in contact with a side of an adjacent rib. The spacing between the axes of such rolls and the dimensions of such ribs are such that the ribs of the rolls overlap each other by an amount which is a small portion of the thickness of the fiber reinforced body of resilient material to be received between the rolls, the diameter of the rolls being at least sufficient to provide troughs between the ribs deep enough to receive the cut material without substantial radial compression but not sufficient to require excessive torque in operation. The rolls are counter-rotated with respect to each other and a means is provided for forcing the cut material from between the ribs.

BRIEF DESCRIPTION OF THE DRAWING

The foregoing and other objects and features of this invention will be more readily apparent from a reading of the following detailed description of preferred embodiments in conjunction with the attached drawing wherein:

FIG. 1 is a perspective view of one embodiment of apparatus for cutting fiber reinforced resilient materials into small parts according to the teaching of this invention with a vehicle tire shown in phantom immediately prior to being received in the apparatus for cutting.

FIG. 2 is a perspective view of the cutter rolls of the apparatus of FIG. 1 taken at a slightly different angle from the perspective of FIG. 1 and with other portions of the apparatus omitted for clarity.

FIG. 2A is an enlarged fragmentary end view in elevation of the apparatus as shown in FIG. 2.

FIG. 3 is a top view of the apparatus of FIG. 1.

FIG. 4 is a perspective view of a further embodiment of apparatus for cutting fiber reinforced resilient material in accordance with the teaching of this invention with a portion of the frame broken away to show the stripping rolls which may be used in conjunction with the cutter rolls according to this invention.

FIG. 5 is a side view in elevation of a cutter disc suitable for use in cutter rolls of the embodiment of FIG. 4.

FIG. 6 is a side view in elevation of a stripper disc suitable for use in the stripper rolls of the embodiment of FIG. 4.

FIG. 7 is an end view in elevation of the embodiment of FIG. 4 with the cutter rolls and hidden portion of the stripper rolls shown in phantom.

FIG. 8 is a cross-sectional view taken along line 8—8 of FIG. 7 with the overlapping portions of one cutter roll omitted.

FIG. 9 is a perspective view of apparatus according to either of the above embodiments of FIG. 1–8 including means for recycling cut material in the form of a rotating drum surrounding such apparatus.

FIG. 10 is a perspective view of apparatus including a plurality of the embodiments of FIGS. 4–8 in vertical array to provide a recycling action.

FIG. 11 is a perspective view of apparatus similar to that shown in FIG. 10 but with the rotating drum spaced from the cutter and with cut material carried to and from the rotating drum by means of conveyor screens.

DETAILED DESCRIPTION OF PREFERRED EMBODIMENTS

Referring to FIG. 1, apparatus according to one embodiment of the teaching of this invention particularly useful in cutting vehicle tires into small parts is shown. Thus, a vehicle tire 10 is shown in phantom, positioned above a pair of cutting rolls 11 and 12 mounted for rotation with a rectangular frame 13. The rectangular frame 13 is open at both the top and bottom thereof and is preferably made of heavy gauge steel or other appropriate metal. The cutting rolls 11 and 12 include shafts 15 and 16 which are journaled in and project through the opposite ends of the rectangular frame 13.

According to the embodiment of the invention shown in FIG. 1, a chain drive wheel 14 is keyed to the projecting end of the shaft 15 at one end of the frame 13. A pair of spur gears 17 and 18 are each keyed to the projecting end of a different one of the shafts 15 and 16 at the opposite end of the frame 13 from the chain drive wheel 14. It will be understood that the axes of the shafts 15 and 16 are parallel to each other and that the spur gears 17 and 18 are adapted to intermesh with each other as shown in the drawing. Thus, when the chain drive wheel 14 is caused to rotate by an appropriate chain (not shown in FIG. 1) coupled to an appropriate motor (not shown in FIG. 1), the cutter roll 11 will be caused to rotate in the same direction and the cutter roll 12 will be caused to rotate in the opposite direction due to the action of the spur gears 17 and 18.

Each of the cutting rolls 11 and 12 comprise a plurality of axially spaced annular ribs and the rolls 11 and 12 are mounted with respect to each other so that the ribs of each intermesh with the ribs of the other. As best shown in FIGS. 2 and 3, such ribs may comprise a plurality of identical apertured discs 19 keyed to the respective shafts 15 and 16 with the discs 19 on each shaft axially spaced from each other by means of annular spacer rings 20 interposed therebetween. The discs 19 have planar opposed major surfaces and a thickness substantially equal to the length of the spacer rings 20.

Thus, as shown in FIGS. 2 and 3, the cutting rolls 11 and 12 may be mounted in the frame 13 with the ribs of each roll intermeshed with the ribs of the other by overlapping the major surfaces of the discs 19 of each roll. According to the teaching of this invention, the amount of overlap between the major surfaces of the discs 19 is a small portion of the total thickness of the material of the vehicle tire to be received therebetween. Also according to the teaching of this invention, the overlapping major surfaces of the discs 19 are substantially in contact with each other, the spacing therebetween being not more than about 0.030 of an inch. The outer periphery of the rolls 11 and 12 provided by the ribs or discs 19 is generally cylindrical providing a sharp corner where each of the major surfaces of the disc join the outer periphery thereof. The combination of such sharp corners with the fact that the overlapping portion of the major surfaces of the discs are substantially in contact with each other provides a scissor-like cutting action whereby the body of the vehicle tire 10 for example will be cut into strips approximating the spacing between the discs 19. Alternate ones of the cut strips will, of course, be forced in opposite directions by the outer periphery of the discs 19 on the respective rolls 11 and 12. Due to the resiliency of the material, such strips will tend to be axially compressed adjacent ones of the discs 19 on a particular roll 11, 12. Thus, it is necessary to provide means for forcing the cut strips out from between the adjacent discs 19 of each roll. According to this embodiment of the invention, a plurality of fingers 23 are interdigitated with the discs 19 or ribs of each roll to plow the cut strips from between the discs 19. As best shown in FIGS. 2 and 2A such fingers 23 may be spring steel strips mounted at one end of the frame 13 and extending below the axis of the rolls to a point below the center of the rolls. The fingers 23 must be wide enough to be close spaced from adjacent discs and may be about one-half inch thick, for example.

Referring particularly to FIG. 1, a plurality of radially extending pegs 21 may be provided about the periphery of each of the discs 19. Such pegs 21 will tend to grip the vehicle tire 10 when the rolls 11 and 12 are counter rotated with respect to each other with roll 11 being rotated in a clockwise direction and roll 12 in a counter-clockwise direction thus pulling the vehicle tire 10 between the rolls. The pegs 21 should be short in order to avoid excessive differential in the velocity thereof with respect to the velocity of the corresponding portions of adjacent discs 19.

It is, of course, true that the sharp corners at the opposite sides of the discs 19 will tend to become dull or rounded in use. Although this will not prevent the apparatus from cutting tires and the like into strips, it will increase the power required to perform such cutting action. For this reason it is desirable to provide means whereby such corners may be conveniently maintained. As best shown in FIG. 2, the outer periphery of the discs 19 may be provided by a separable strip or a plurality of strips 22. Furthermore, the pegs 21 may be provided by elongated heads of bolts adapted to be threaded through such strips and into appropriately threaded openings in the periphery of the discs 19. Thus, the removal of the strips forming the outer periphery of the discs 19 for maintenance or replacement will be facilitated.

It has been found that a spacing of about 0.005 of an inch between the overlapping major surfaces of the discs 19 of the cutter rolls 11 and 12 can be conveniently obtained and maintained. Furthermore, it has been found that this spacing will provide a suitable cutting action for the reinforcing fibers used in modern tires including both steel belts and cords or fabrics of various synthetic materials, for example.

In the embodiment of the invention shown in FIGS. 1-3, the internal dimensions of the rectangular frame are about 49 inches long by 36 inches wide by 24 inches deep. The cutter rolls are about 18 inches in maximum diameter and about 44 inches long. The ribs or discs 19 are spaced from each other by about 2 inches and the shafts upon which the discs 19 are mounted are about 6 inches in diameter with the spacers interposed between the discs 19 being about 8-½ inches in outer diameter with an internal diameter dimensioned to be received over the shafts. As mentioned hereinabove, the cutter discs 19 are keyed to the shaft by means of any conventional key and keyway arrangement.

The axes of the shafts are spaced from each other by a distance of about 17-¾ inches. Thus, the sides of the discs 19 of one roll overlap the sides of the discs 19 of the other roll by a maximum of about ¼ inch, leaving a minimum of about 5-½ inches of the depth of the trough between the discs 19 for passage of the cut material.

In actual operation of this embodiment of the invention a 100 horsepower electrical motor was used to drive the cutter rolls through an appropriate gear reduction and chain drive means at a speed of about 20 revolutions per minute although efficient operation may be obtained at speeds from about 10 revolutions per minute to about 35 revolutions per minute. The cutting rolls 11 and 12 are made of steel and the periphery of each rib or disc 19 is preferably made of chromium alloy tool steel preferably provided by means of strips fastened to the outer periphery of the discs 19 as described hereinabove.

Referring to FIGS. 4 through 8, a further embodiment of the apparatus according to the teaching of this invention is shown. The embodiment of FIGS. 4 through 8, differs from the embodiment of FIGS. 1 to 3 primarily in that the peripheral surfaces of the ribs of the cutting rolls comprise a plurality of flat surfaces rather than a single cylindrical surface and in that a pair of stripping rolls each intermeshed with a different one of the cutting rolls are included in the apparatus in place of the fingers 23.

Thus, referring to FIG. 4, a pair of cutting rolls 41 and 42 are mounted for rotation in a frame 43 by means of shafts 45 and 46 with a chain drive wheel 44 keyed to one of the shafts 45 as described in connection with the embodiment of FIGS. 1 to 3. However, as best shown in FIG. 8, a spur gear 48 is keyed to the other shaft 46 at the same end of the frame as the chain drive wheel 44 and is adapted to intermesh with a spur gear (not shown) keyed to the same end of the shaft 45 as the chain drive wheel 44. Thus, rotation of the chain drive wheel 44 will result in counter-rotation of the cutting rolls 41 and 42 as described in connection with the embodiment of FIGS. 1 to 3.

As best shown in FIG. 5, the ribs of the cutting rolls 41 and 42 of this embodiment of the invention are provided by a plurality of identical apertured discs 49 keyed to the shafts 45 and 46 with spacer rings 50 interposed therebetween as described in connection with the embodiment of FIGS. 1 to 3. However, the outer periphery of the discs 49 is not cylindrical as described in connection with the embodiment of FIGS. 1 to 3 but instead is provided by a plurality of flat surfaces including short, radially extending surfaces about ¾ inch long and longer chordal segment surfaces in an arrangement producing a generally sawtooth outer peripheral surface on the discs 49. A plurality of strips 52 made of ¾ inch thick chrome alloy tool steel for example and each having a length greater than the length of the chordal segment surfaces on the outer periphery of the disc 49 by an amount just sufficient to cause its outer surface to overlap the next chordal segment surface and a width equal to the width of the disc 49 may be fastened to the chordal segment surfaces by means of bolts 53.

It will be seen that the free ends 51 of the strips 52 will provide a positive feed action similar to that provided by the pegs 21 of the embodiment shown in FIGS. 1 to 3. It will also be seen that the use of a plurality of flat cutting surfaces provided by the strips 52 instead of the cylindrical cutting surface provided by the strips 22 of the embodiment shown in FIGS. 1 to 3 will tend to result in vibration of the apparatus in operation. However, according to this embodiment of the invention, the discs 49 may be rotationally offset from each other in order to minimize such vibration. Thus, all of the strips 52 and flat chordal segment surfaces upon which they are mounted are of the same length which length may subtend an angle of 30°, for example, whereby a total of 12 chordal segment surfaces and strips 52 provide the outer periphery of the disc 49. By providing four keyways 55 (at 0°, 97-½°, 195° and 292-½°, respectively) beginning at the left hand side and proceeding clockwise about the outer periphery of the shafts 45 and 46 as best shown in FIG. 5, the identical discs 49 forming the ribs of the rolls may be rotationally offset from each other by simply aligning the keyway of each disc with a different keyway 55 from the keyways 55 with which adjacent discs 49 are aligned. Preferably, the discs 49 of each roll 41, 42 are rotationally offset from each other in groups of four adjacent discs, as best shown in FIGS. 8 to produce a helical arrangement which has an opposite sense on each roll as shown in FIG. 4 since such arrangement tends to substantially eliminate vibration in operation.

According to this embodiment of the invention, a pair of stripper rolls 61 and 62 are mounted for rotation in the frame 43 below the cutter rolls 41 and 42 as best shown in FIG. 7. It will be seen that each stripper roll comprises a plurality of ribs adapted to intermesh with the ribs of a different one of the cutter rolls 41, 42 although the ribs of the stripper rolls 61, 62 do not intermesh with each other. As best shown in FIG. 6, the ribs of the stripper rolls may be provided by a plurality of identical apertured discs 63 keyed to shafts 65 and 66 with spacer rings 64 therebetween. The outer periphery of the discs 63 are preferably provided with sharply pointed teeth in the nature of gear teeth to enhance the action of the stripper rolls in pulling cut strips of vehicle tires and the like from between the ribs of the respective cutter rolls 41, 42.

As best shown in FIG. 4, the corresponding ends of the shafts 45 and 46, associated with cutter rolls 41 and 42, are each provided with a sprocket wheel 47 keyed thereto. Similarly, the corresponding ends of the shafts 65 and 66 associated with the stripper rolls 61 and 62 are each provided with a sprocket wheel 67 keyed thereto. The sprocket wheel 47 keyed to the shaft 45 of the cutter roll 41 is coupled to the sprocket wheel 67 keyed to the shaft 65 of the stripper roll 61 by means of a first continuous chain 71 and the sprocket wheel 47 keyed to the shaft 46 of the cutter roll 42 is coupled to the sprocket wheel 67 keyed to the shaft 66 of the stripper roll 62 by means of a second continuous chain 72. Thus, the clockwise rotation of the cutter roll 41 will cause the stripper roll 61 to rotate in a clockwise direction through the action of the sprocket wheels 47 and 67 and the continuous chain 71 and the simultaneous rotation of the cutter roll 42 in a counterclockwise direction through the action of the spur gear 48 will cause the stripper roll 62 to rotate in a counterclockwise direction due to the action of the sprocket wheels 47 and 67 and the second continuous chain 72. However, it will be understood that the intermeshing portions of the cutter roll 41 and stripper roll 61 will move in an opposite sense relative to each other. Similarly, the intermeshing portions of the cutter roll 42 and stripper roll 62 will move in an opposite sense with respect to each other. To further enhance the stripping action resulting from the opposed motion of the associated stripper and cutter rolls the sprockets 47 have a larger diameter than the sprockets 67 thus causing the stripper rolls to rotate more rapidly than the cutter rolls.

The embodiment of the apparatus according to the teaching of this invention shown in FIGS. 1 through 8 may also be efficiently driven by a 100 hp electrical motor coupled to the chain drive wheel 44 through an appropriate gear reduction and chain drive means to rotate the cutter rolls at a speed of between 10 and 35 rpm with the stripper rolls rotating at a higher number of revolutions per minute than the cutter rolls. The maximum outer diameter of the cutter rolls 41 and 42 is preferably about 18 inches and the maximum outer diameter of the discs 63 of the stripper rolls is preferably about 15 inches. The shafts 45 and 46 are preferably about 6 inches in diameter, the shafts 65 and 66 are about 3 inches in diameter, the spacer rings 50 are about 8-½ inches in outer diameter and the spacer rings 64 are about 4 inches in outer diameter with the inner diameter of the spacer rings 50 and 64 adapted to fit over the respective shafts. The shafts 45, 46, 65 and 66 are, of course all mounted in the frame 43 with their axes parallel to each other and the axis of each stripper roll is spaced from the axis of the cutter roll associated therewith to allow a small clearance between the outer periphery of the discs 63 of the stripper rolls 61 and 62 and the outer periphery of the spacer rings 50 of the cutter rolls 41 and 42, as best shown in FIG. 8. The spacing between the axes of the stripper rolls 61 and 62 is preferably slightly greater than the spacing between the axes of the cutter rolls 41 and 42. For example, the axes of the cutter rolls 41 and 42 are spaced from each other by a distance of 16-¼ inches whereas the axis of the stripper rolls are spaced from each other by a distance of 20-¼ inches according to the embodiment of the invention shown in FIGS. 1 through 8. Thus, as shown in FIG. 7, the outer periphery of the stripper rolls 61 and 62 are spaced from each other to allow free passage therebetween of the cut material stripped from between the discs 49 of the cutter rolls 41, 42, whereas the outer peripheries of the discs 49 overlap each other by a maximum of 2-¼ inches and a minimum of ½ inch.

It will be understood that a single passage of a vehicle tire between the cutter rolls of either embodiment of this invention will tend to produce a plurality of elongated slices of such vehicle tire. If such elongated slices are passed through the apparatus a second time, each of such slices will tend to be cut into a plurality of smaller slices and repeated passage of cut slices through the apparatus will reduce the size of the cut slices to parts which are not more than about 2 inches square where the ribs of the cutter rolls are spaced from each other by a distance of 2 inches, as described hereinabove.

Referring to FIG. 9, one means of recycling the cut material through the cutting apparatus is shown. In FIG. 9 a cutting apparatus according to the teaching of this invention is represented schematically within a large diameter drum 90 fabricated of large mesh woven wire. The drum 90 may have a plurality of axially extending vanes 91 distributed about the inner periphery thereof and the axis of the drum 90 may either be parallel to the axes of the cutter rolls 11 and 12, as shown in FIG. 9, or perpendicular thereto. The drum 90 is caused to rotate about its axis as by means of an appropriate motor 92 and belt or chain 93. The cutter rolls 11 and 12 may be driven by an appropriate electrical motor 94 coupled to the chain drive wheel 14 by means of an appropriate chain 95.

Thus, when a vehicle tire or the like is fed between the cutter rolls 11 and 12, a plurality of slices thereof will drop from the bottom of the frame 13 and be received on the inner surface of the drum 90. The rotation of the drum 90 at a fairly high speed will produce sufficient centrifugal force which, together with the action of the vanes 91, will carry the cut slices from beneath the cutter rolls 11 and 12 toward the top of the drum where the force of gravity will cause them to be reintroduced between the cutter rolls 11 and 12. It will be understood that the mesh of the woven wire of which the drum 90 is constructed is selected so that any cut parts smaller than about 2 inches square, for example, will drop through the mesh and out of the drum 90 since their reintroduction between the cutter rolls 11 and 12 is unlikely to result in further reduction in size thereof.

It will be understood that the cutting apparatus may be supported by any convenient means within the drum 90 and that the drum 90 may also be supported for rotation by any convenient means. In this regard, it should be noted that the sides of the frame 13 may be omitted where the ends of the cutter rolls may be appropriately mounted by other means since such sides perform no other function in the cutting apparatus.

Referring to FIG. 10, recycling of the cut material may also be accomplished by constructing duplicate units of the apparatus according to the teaching of this invention and mounting such units in a vertical stack. Thus, as shown in FIG. 10, three units each constructed as described in connection with FIGS. 4 through 8 are shown schematically as mounted in a vertical stack but with the means for driving the cutting apparatus omitted. Thus, a vehicle tire or the like introduced between the cutter rolls 41 and 42 of the uppermost unit will be cut into a plurality of strips which strips will fall into the second unit for further cutting and finally into the lowermost unit for a final cutting operation. After the final cutting operation the cut parts may be received on an appropriate conveyor belt 96 for transportation to a point of utilization or disposal.

Referring to FIG. 11, a further arrangement for recycling cut materials to a cutting apparatus 99 according to either of the embodiments of this invention described hereinabove is shown. According to this arrangement, the cut material from the cutting apparatus 99 drops onto a belt 96 where it is conveyed to a drum 90, similar to that described in connection with FIG. 9 but spaced from the cutting apparatus 99. The action of the drum 90 according to the arrangement shown in FIG. 11 is to cause the larger cut portions to be deposited on a second conveyor belt 98 for reintroduction into the cutting apparatus 99. The smaller cut particles will pass through the mesh of which the drum 90 is constructed as described in connection with FIG. 9, and thus the drum 90 may conveniently be located at or near the point of utilization or disposal of the cut material.

Apparatus according to the teaching of this invention is capable of reducing one thousand auto tires including bead, or 500 whole truck tires including bead, per hour to cut parts approximately 2 inches square. Since the volume occupied by the cut parts will be approximately 75% less than the volume occupied by the uncut tires an immediate saving in storage space will be achieved. As pointed out hereinabove, the cut parts may be more easily disposed of by conventional burying operations and will be subject to more rapid deterioration than uncut tires.

It has been found that appaaratus according to the teaching of this invention can be operated for more than 1000 hours without maintenance of the cutter rolls. In addition, the cutting surfaces of the cutter rolls can be easily replaced by the user as required.

Apparatus according to the teaching of this invention having the capacity described above and including a 100 hp electric drive motor weighs about 8 tons and occupies a volume 8 feet × 8 feet × 8 feet and requires a power supply of 230V 3 phase at 250 amperes maximum. Thus, the apparatus can be easily transported from one site to another for utilization. Appropriate automatic control circuitry for overload protection may be included in the apparatus. Appropriate input and output conveyors may of course require additional power and it is anticipated that those skilled in the art will make appropriate adaptations of the teaching of this invention to suit specific requirements.

It should be pointed out that the specific dimensions of the embodiments of the apparatus according to this invention described hereinabove are related to the use of such apparatus in cutting vehicle tires. However, it is critical according to this invention that the opposed sides of the discs of the cutter rolls be substantially in contact (i.e., spaced, but not more than about 0.030 of an inch) that such discs overlap each other at least slightly and that the amount of such overlap be a small portion of the thickness of the particular resilient body to be cut in order to insure efficient operation and dependable apparatus design.

It will be understood that the cut material must pass between the cutter rolls. Thus, the amount of overlap between the discs will establish the minimum diameter of the cutter discs required to cut a given thickness of resilient material. The minimum outer diameters of the shafts including the spacer rings and therefore the minimum spacing between the axes of the cutter rolls will be a function of the given thickness of resilient material to be cut into strips by a particular apparatus according to this invention. The shafts must have a sufficient diameter to reliably transfer the torque required to cut the given thickness of resilient material and the spacer ring must have sufficient wall thickness to withstand the forces to which they will be subject in cutting the given thickness of resilient material.

It has been found that if the amount of overlap between the cutter discs is more than a small portion of the maximum thickness of the resilient material to be cut, then the minimum diameter of the cutter discs required will tend to make the apparatus too inefficient for economically practical use by requiring an excessive amount of torque to drive it, and adding to the expense and complication of the fabrication and maintenance of the apparatus.

The amount of force required to push the cut strips of resilient material in opposite directions into adjacent troughs between cutter discs will increase, as the amount of overlap increases, thus increasing the power and torque required in operation. It will be understood that a cut strip of resilient material will tend to be axially compressed between the sides of the discs forming the trough in which it is received, thus producing substantial frictional resistance to being forced into the trough.

The velocity differential between the outer periphery of a given cutter disc of one roll and the sides of the adjacent cutter discs of the other roll will increase, as the amount of overlap increases, thus increasing the power and torque required in operation. It will be understood that a cut strip of resilient material will tend to be in compressive contact with both the peripheral surface of a cutter disc on one roll and the side surface of the adjacent cutter discs of the other roll thus offering frictional resistance to the velocity differential therebetween.

The entrance angle, defined as the angle between tangents drawn to the peripheral surface of adjacent discs of each roll through the point at which such adjacent discs first begin to overlap (as represented by the angle X in FIG. 7) will increase, as the amount of overlap between such discs increases, thus tending to increase the power and torque required in operation as well as introducing feeding difficulties. It will be understood that the actual cutting of the material will occur at the point of first overlap between cutter discs (the apex of the entrance angle) and that the distance between such point and the common plane of the axes of the cutting rolls will increase as the cutting angle increases thereby resulting in an increased lever arm through which the cutting force must be applied. In addition, a small entrance angle will tend to facilitate the feeding action of the apparatus and will tend to avoid requirements for sudden surges of power.

The depth of the trough between the ribs of the cutting rolls must be at least equal to the maximum thickness of the material being cut in order to avoid radial compression thereof against the bottom of the trough which would tend to increase the power and torque required in operation. However, the depth of such trough should not be so large as to tend to require an increase in the minimum diameter of the cutting rolls required for other reasons, since larger diameter rolls will not only increase materials costs but will require increased torque in operation and thus more expensive gear boxes at a given power level.

What is claimed is:

1. Apparatus for cutting fiber reinforced resilient materials such as vehicle tires and the like into small parts comprising a pair of generally cylindrical cutting rolls mounted for rotation with their axes parallel and each including a plurality of axially spaced radially extending ribs forming troughs therebetween with said ribs of each roll meshing with said ribs of the other roll, each of said ribs having planar sides with a side of each rib of one roll overlapping and spaced less than about .030 inch from a side of an adjacent rib of the other roll, and each of said ribs having a plurality of radially extending protrusions spaced from each other about the outer periphery thereof, the spacing between the axes of said rolls and the dimensions of said ribs being such that said ribs of said rolls overlap each other by an amount which is less than the maximum thickness of said fiber reinforced resilient material as received between said rolls.

2. Apparatus as claimed in claim 1 including means for forcing the cut resilient material from said troughs between said ribs.

3. Apparatus as claimed in claim 2 wherein the remaining depth of said troughs between said ribs is at least equal to and not much greater than the maximum thickness of said resilient material as received therein.

4. Apparatus as claimed in claim 2 including a pair of generally cylindrical stripping rolls mounted for rotation with their axes parallel to each other and to the axes of said cutting rolls and each including a plurality of axially spaced radially extending ribs having a plurality of radially extending protrusions about the outer periphery thereof and forming troughs therebetween with said ribs of each of said stripping rolls meshing with said ribs of a different one of said cutting rolls, each of said ribs of each of said stripping rolls having planar sides with a side of each rib of each stripping roll overlapping and spaced from a side of an adjacent rib of the cutting roll corresponding thereto, the spacing between the axis of each stripping roll and said cutting roll corresponding thereto and the dimensions of said ribs of said stripping rolls including said radial protrusions thereon being such that said ribs of each of said stripping rolls overlap said ribs of said cutting roll corresponding thereto by an amount approaching the depth of said troughs between said ribs of said cutting rolls.

5. Apparatus as claimed in claim 4 wherein each of said generally cylindrical cutting and stripping rolls comprises a shaft with a plurality of discs keyed to said shaft and alternating with spacer rings to provide said axially spaced radially extending ribs thereof, the ends of said shafts of said cutting and stripping rolls being journaled in a support means and a drive wheel keyed to one end of each of said shafts of said cutting and stripping rolls.

6. Apparatus as claimed in claim 5 wherein the drive wheel keyed to the end of the shaft of each of said stripping rolls is mechanically coupled by an endless coupling means to rotate with the drive wheel keyed to the corresponding end of the cutting roll intermeshed therewith, said drive wheels keyed to the ends of the shafts of said cutting roll each having a larger diameter than said drive wheels keyed to the ends of said shafts of said stripping rolls.

7. Apparatus as claimed in claim 1 wherein said overlapping planar sides of said ribs are spaced from each other by about 0.005 inch.

8. Apparatus as claimed in claim 7 wherein each of said generally cylindrical cutting rolls comprises a shaft with a plurality of discs keyed to said shaft and alternating with spacer rings to provide said axially spaced radially extending ribs thereof, the ends of said shafts of said cutting rolls being journaled in a support means with a pair of intermeshing spur gears each keyed to a different one of said shafts at corresponding ends thereof and a drive wheel keyed to one end of one of said shafts.

9. Apparatus as claimed in claim 8 wherein the outer periphery of each of said discs of each of said cutter rolls is provided by a separable strip of metal removably mounted thereon.

10. Apparatus as claimed in claim 9 wherein said radially extending protrusions each comprise a generally cylindrical elongated peg having a threaded end threadably received in a different one of a plurality of threaded holes in the outer periphery of said discs and said separable strips of metal are removably mounted on said discs by said protrusions.

11. Apparatus as claimed in claim 1 further including a drum surrounding said generally cylindrical cutting rolls, said drum being mounted for rotation about its axis.

12. Apparatus as claimed in claim 11 wherein the axis of said drum is generally parallel to said axes of said cutting rolls and the wall of said drum has a plurality of apertures therethrough of given cross-sectional dimensions.

13. Apparatus as claimed in claim 1 including a plurality of pairs of said generally cylindrical cutting rolls mounted in a vertical stack with the axes of each pair of cutting rolls generally parallel to the axes of the other pairs of cutting rolls.

14. Apparatus as claimed in claim 1 further including a first conveyor belt extending from beneath said pair of generally cylindrical cutting rolls to a remote point, a cylindrical drum surrounding the end of said first conveyor belt at said remote point and mounted for rotation about the cylindrical axis thereof and a second conveyor belt located above said first conveyor belt and extending from within said drum to a point above said pair of generally cylindrical cutting rolls, said drum having a plurality of apertures through the wall thereof of given cross-sectional dimensions.

15. Apparatus for cutting fiber reinforced resilient material such as vehicle tires and the like into small parts comprising a pair of generally cylindrical cutting rolls mounted for rotation with their axes parallel and each including a plurality of axially space radially extending ribs forming troughs therebetween with said ribs of each roll meshing with said ribs of the other roll, each of said ribs having planar sides with a side of each rib of one roll overlapping and spaced less than abut .030 inch from a side of an adjacent rib of the other roll, and each of said ribs of said cutting rolls having a generally sawtooth outer peripheral surface including a plurality of spaced radially extending flat surfaces interconnected by flat surfaces extending along chordal segments thereof.

16. Apparatus as claimed in claim 15 wherein the radially extending flat surfaces are identical to each other, said flat surfaces extending along said chordal segments are identical to each other and a plurality of identical separable strips of metal are each removably mounted on a different one of said flat surfaces extending along said chordal segments, said strips having a width equal to said flat surfaces extending along said chordal segments and a length greater than said flat surfaces extending along said chordal segments by an amount sufficient to cause the upper surface thereof to overlap the next chordal segment surface.

17. The method of cutting fiber reinforced resilient material such as vehicle tires and the like into smaller parts by passing said materials between a pair of generally cylindrical rolls, said method comprising the steps of:
   a. providing both said rolls with a plurality of axially spaced radially extending ribs having opposed planar surfaces with radial dimensions greater than the thickness of said resilient material;
   b. positioning said rolls with their axes parallel to each other and with said ribs of each roll meshing with said planar surfaces of said ribs of one roll substantially in contact with and overlapping said planar surfaces of said ribs of said other roll by an amount which is less than the maximum thickness of said resilient material;
   c. counter-rotating said rolls with respect to each other about their respective axes;
   d. feeding said resilient material between said rolls; and
   e. forcing the cut parts of said resilient material from between said ribs of each of said rolls.

18. The method of claim 17 including the step of repeating said method with respect to said cut parts forced from between said ribs of each of said rolls.

19. The method of claim 18 including the step of selectively removing all of said cut parts having maximum dimensions smaller than a given dimension before said step of repeating said method.

* * * * *